(12) United States Patent
Tayler (10) Patent No.: US 7,873,895 B2
(45) Date of Patent: Jan. 18, 2011

(54) MEMORY SUBSYSTEMS WITH FAULT ISOLATION

(75) Inventor: Michael Kennard Tayler, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 12/418,581

(22) Filed: Apr. 4, 2009

(65) Prior Publication Data

US 2009/0193316 A1 Jul. 30, 2009

Related U.S. Application Data

(63) Continuation of application No. 11/103,130, filed on Apr. 11, 2005, now Pat. No. 7,546,514.

(51) Int. Cl.
*G11C 29/00* (2006.01)
(52) U.S. Cl. .................. 714/763; 714/718; 714/724
(58) Field of Classification Search ............. 714/763, 714/718, 724, 735, 754, 764, 766, 799, 42, 714/44, 46, 54, 55
See application file for complete search history.

(56) References Cited

U.S. PATENT DOCUMENTS

| | | | |
|---|---|---|---|
| 4,201,337 A | 5/1980 | Lewis et al. | |
| 4,358,848 A | 11/1982 | Patel | |
| 4,450,561 A | 5/1984 | Gotze et al. | |
| 4,667,329 A * | 5/1987 | Murray et al. | 714/735 |
| 4,709,366 A * | 11/1987 | Scott et al. | 714/46 |
| 5,063,533 A | 11/1991 | Erhart et al. | |
| 5,200,963 A | 4/1993 | Chau et al. | |
| 5,418,796 A | 5/1995 | Price et al. | |
| 6,493,843 B1 | 12/2002 | Raynham | |
| 6,554,903 B1 * | 4/2003 | Sessa | 118/317 |
| 6,557,121 B1 * | 4/2003 | McLaughlin et al. | 714/44 |
| 6,618,825 B1 * | 9/2003 | Shaw | 714/55 |
| 6,662,332 B1 | 12/2003 | Kimmitt | |
| 6,735,726 B2 | 5/2004 | Muranaka et al. | |
| 6,799,287 B1 | 9/2004 | Sharma et al. | |
| 6,848,070 B1 | 1/2005 | Kumar | |
| 7,032,158 B2 | 4/2006 | Alvarez et al. | |
| 7,134,069 B1 | 11/2006 | Longwell et al. | |
| 2003/0172235 A1 | 9/2003 | Letey et al. | |

OTHER PUBLICATIONS

Shankland, "Can HP's 'Super' server save Itanium?", cnet news.com, Last Modified Mar. 21, 2004, http://news.com.com/CAN+HPs+Super+server+save+Itanium/2100-1006 3-5647701.html.

* cited by examiner

*Primary Examiner*—Fritz Alphonse

(57) ABSTRACT

An exemplary memory subsystem with fault isolation comprises a first data bus routing data groupings in a lower 72 bits to a first memory expander, and a second data bus routing data groupings in an upper 72 bits to a second memory expander. A first memory module receives all of the data groupings in the lower 72 bits of each memory expander. A second memory module receives all of the data groupings in the upper 72 bits of each memory expander. A failure in any one or more bytes in an ECC word indicate failures in the computer memory system.

20 Claims, 12 Drawing Sheets

MEMORY SUBSYSTEMS WITH FAULT ISOLATION

CROSS-REFERENCE TO RELATED APPLICATION

This application is a continuation of U.S. nonprovisional patent application Ser. No. 11/103,130, filed 11 Apr. 2005, now U.S. Pat. No. 7,546,514, which is incorporated herein by reference as though fully set forth herein.

BACKGROUND

Computer devices are typically provided with extensive memory systems, increasing the probability of memory errors. Memory errors may occur in the computer memory during a store and/or retrieve operation, causing incorrect or even no data at all being returned. These memory errors may be "soft" or "hard" errors. Soft memory errors occur when data randomly changes state. Hard memory errors occur when one or more of the computer memory chips fail. Both types of memory errors are undesirable, and may even be unacceptable, particularly in high-end computer systems, such as, e.g., in network servers.

Error Correction Code (ECC) operations may be implemented to handle soft memory errors. ECC algorithms typically include check bits along with the data bits being stored in memory. When the data is retrieved from memory, the ECC algorithm evaluates the check bits and data bits to automatically detect and correct errors in the data. Although the ECC algorithm may detect multiple-bit errors, only correct single-bit errors can be corrected.

Advanced ECC operations (also referred to as "chip correct") are available to detect and correct multi-bit memory errors. In addition, advanced ECC algorithms also report errors (e.g., to the system BIOS or other firmware). The error reports may be used to identify hard memory errors so that one or more failed memory modules can be replaced.

However, conventional ECC algorithms implement a word size that must be less than or equal to the smallest critical word length. Accordingly, these ECC algorithms do not provide the desired level of data correction/fault isolation.

DETAILED DESCRIPTION

Exemplary embodiments of chip correct and fault isolation implement interleaving to enable use of a wide ECC word over a collection of narrower data chunks of arbitrary alignment, with minimum latency impact. Exemplary embodiments may also implement data alignment and/or multiplexing operations. Accordingly, the systems and methods described herein allow greater chip correct functionality and finer fault isolation granularity, resulting in higher availability and reliability of the computer memory system.

Exemplary Systems

Figure 1:
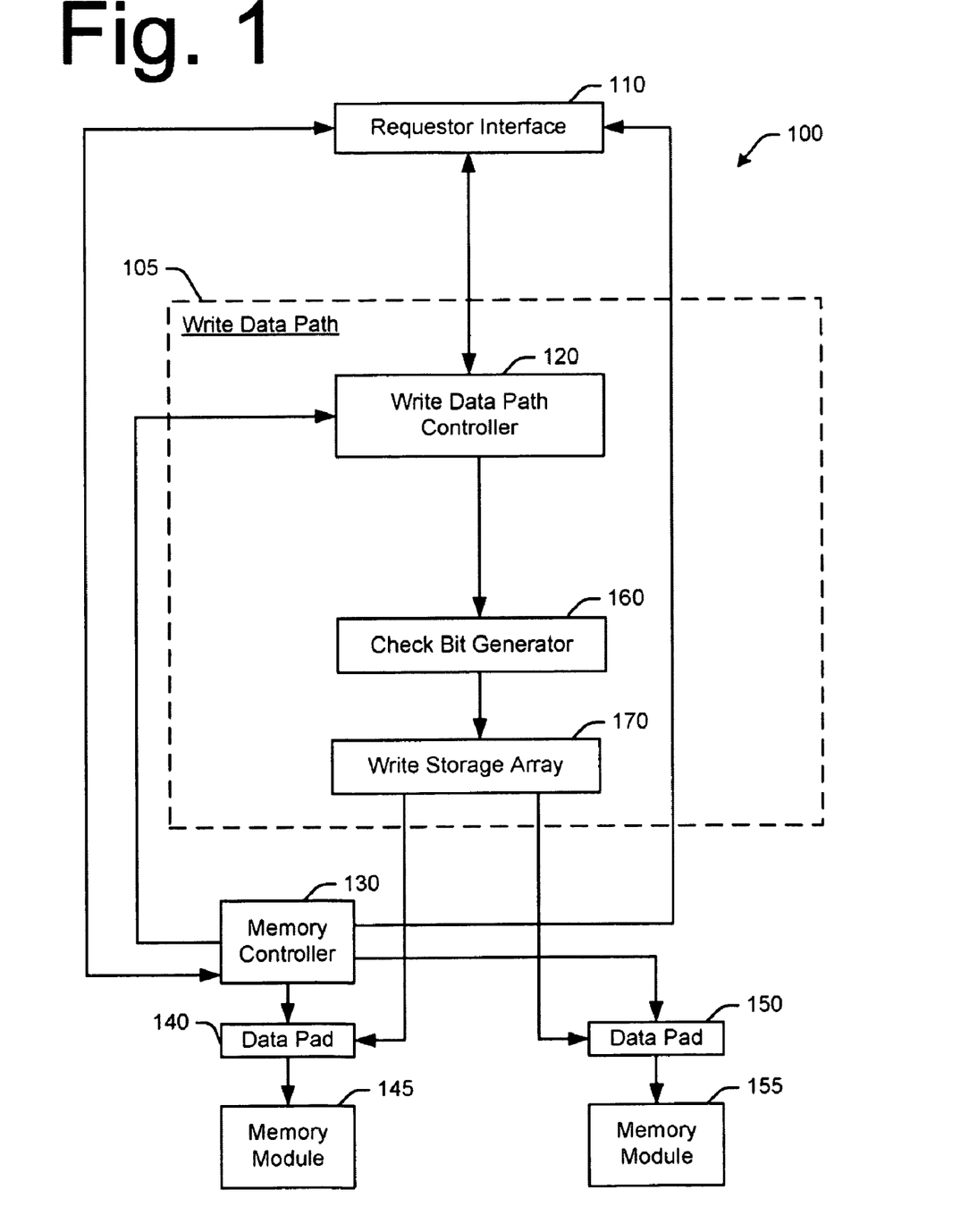
FIG. 1 is a high-level block diagram of a write data path for an exemplary computer memory system in which chip correct and fault isolation may be implemented.

FIG. 1 is a high-level block diagram illustrating a write data path 105 for an exemplary computer memory system 100, in which chip correct and fault isolation may be implemented. Exemplary computer memory system 100 may include a requestor interface 110 communicatively coupled to the write data path 105 via write data path controller 120. Requestor interface 110 may include a requesting device (e.g., a processor) and/or a system bus (not shown). Requestor interface 110 may also be communicatively coupled with a memory controller 130 for one or more data pads 140, 150 coupled to memory modules 145, 155, respectively.

Write data path 105 includes a write data path controller 120 communicatively coupled with a check bit generator 160 and a write storage array 170. Check bit generator 160 generates check bits for the data to be written to memory. In an exemplary embodiment, the data is 256 bits wide and includes a corresponding error correction code that is 32 bits wide. Output of the write storage array 170 is coupled to an input of one or more of data pads 140, 145.

Check bit generator 160 may be provided with Error Correction Code (ECC) circuitry. ECC (and advanced ECC) is well understood in the art and may be implemented to perform encode, decode, and correct operations for computer memory systems. Generally, ECC algorithms which may be implemented for check bit generator 160 detect and correct errors on a byte or nibble basis (e.g., single byte, double byte, single nibble, etc.). An exemplary ECC algorithm may implement a decoding procedure of a [36, 32, 5] shortened narrow-sense Reed-Solomon Code over $GF(2^8)$. The ECC encode operations produce 32 check bits that are stored with every 256 bits of data (i.e., 288 bits total word length) in a process of XOR'ing all of the entries in an ECC H-matrix whose corresponding bits in the input data word are set. It is noted, however, that other ECC (and Advanced ECC) algorithms may also be implemented for memory system 100.

Write storage array 170 may include a plurality of storage cells. In an exemplary embodiment, write storage array 170 is a 288×128 storage array with 128 cells, each cell being 288 bits wide. Write storage array 170 is designed to store thirty-two cache lines addressable in quarter cache line portions, for a total of 128 288-bit wide storage locations. A cache line is typically the minimum size data set that a requestor interface may request.

Upon receipt of memory data and associated control signals from the requestor interface 110 and Memory Controller 130, write data path controller 120 asserts one or more control signals. Control signals are provided to storage array 170 and are used to control the write operations.

Figure 2:
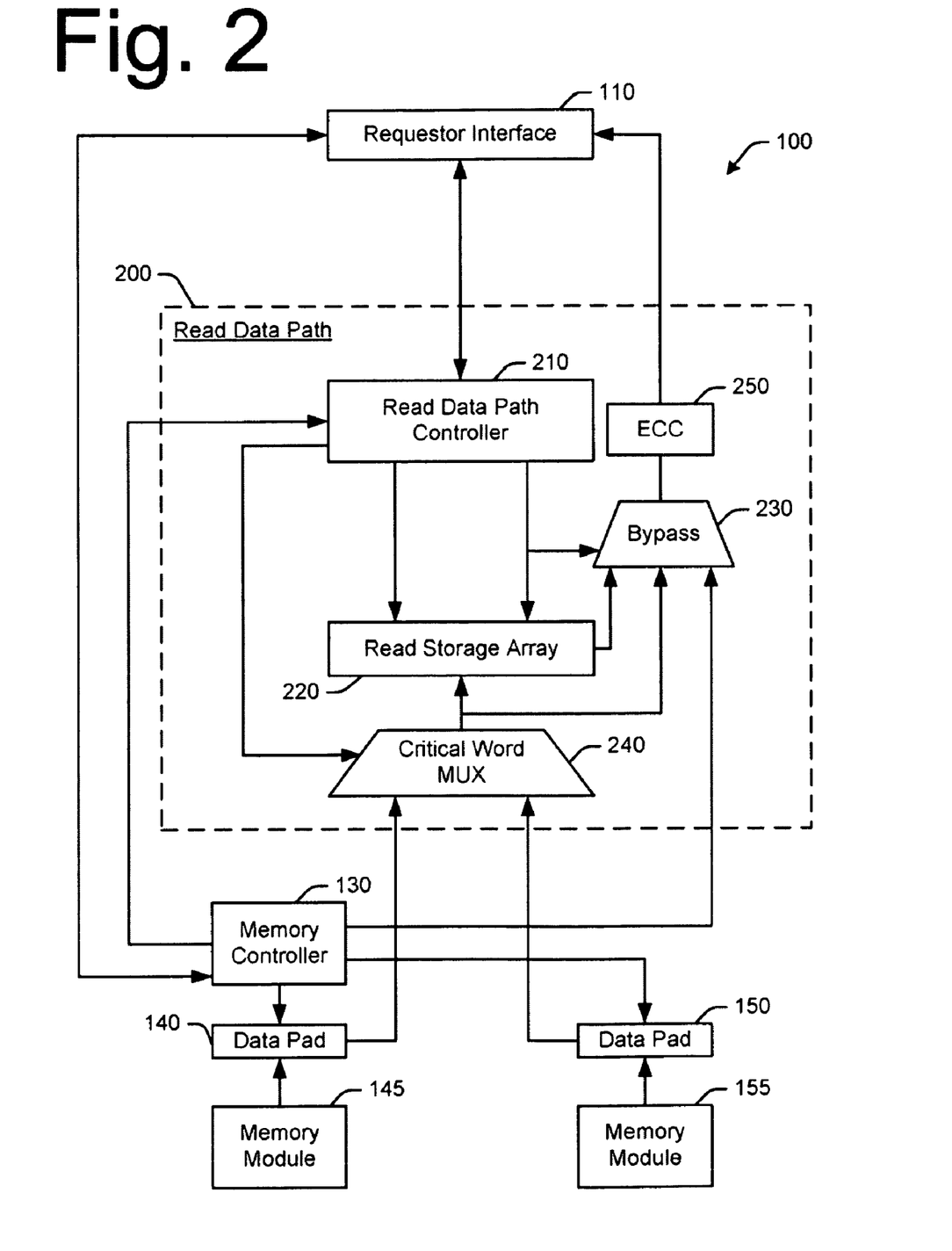
FIG. 2 is a high-level block diagram illustrating a read data path for the exemplary computer memory system shown in FIG. 1.

FIG. 2 is a high-level block diagram illustrating a read data path 200 for the exemplary computer memory system 100 shown in FIG. 1. The read data path 200 includes a read data path controller 210 communicatively coupled with a read storage array 220 and a bypass circuit 230. Read data path 200 may also include a critical word multiplexer 240. The inputs of critical word multiplexer 240 are coupled to an output of one or more of data pads 140, 145 and to an output of read data path controller 210. The output of critical word multiplexer 240 is coupled to an input of read storage array 220 and an input of bypass circuit 230. The output of read storage array 220 is communicatively coupled to an input of bypass circuit 230, the output of which is in turn communicatively coupled to requestor interface 110 via ECC module 250.

Read storage array 220 may include a plurality of storage cells. In an exemplary embodiment, read storage array 220 is a 288×128 storage array with 128 cells, each cell being 288 bits wide. Read storage array 220 is designed to store thirty-two cache lines addressable in ¼ cache line portions, for a total of 128 288-bit wide storage locations.

Critical word multiplexer 240 receives data from one or more of the memory modules 145, 155 via data pads 140, 150, respectively. The width of data received from the data pads may vary depending on the operating mode of read data path controller 210. As such, critical word multiplexer 240 may queue the data so that data of a valid or acceptable width may be provided to requester interface 110. Furthermore, depending on the mode of operation of read data path controller 210, the data may be received from the data pads at different clock intervals. For example, data may be received every clock cycle or every other clock cycle.

Read data path controller 210 may assert control signals that are used to control read and write operations at read storage array 220. Read data path controller 210 may also assert control signals instructing critical word multiplexer 240 to format data received from data pads 140, 145 into the word order requested by a requesting device.

Data from critical word multiplexer 240 is provided to read storage array 220 and/or to bypass circuit 230. In the exemplary embodiment, formatted data for the ECC module 250 is preferably 288 bits wide.

As discussed above for the write data path 105, an exemplary ECC algorithm may implement a decoding procedure of a [36, 32, 5] shortened narrow-sense Reed-Solomon Code over GF(2^8). Exemplary ECC correction operations may include: 1) computing a systematic syndrome using the same process as the encoding operation, 2) converting the systematic syndrome to a power sum syndrome by XOR'ing the systematic syndrome with a series of predefined T matrixes, 3) decoding the power sum syndrome using log, exponent, and square root tables to indicate the byte location of the error(s) and generate the corrected data byte(s), and 4) inserting the corrected data into the data word. Output from the decoding operation may include an ErrorLoc0 value identifying the byte location of the first corrupted data byte, and an ErrorLoc1 value identifying the byte location of the second corrupted data byte.

Output from the decoding operation may also include an ErrorVal0 having 8 bits of data used to correct the first corrupted data byte, and an ErrorVal1 having 8 bits of data used to correct the second corrupted data byte. A flag may also indicate if an error is uncorrectable.

Read data path controller 210 may also generate and provide control signals to read storage array 220 and bypass circuit 230 to inform them that the data arriving via critical word multiplexer 240 is valid in the current clock cycle. Output data from read storage array 220 may be routed to bypass circuit 230. Read data path controller 210 may also generate and provide control signals to bypass circuit 230. Control signals instruct bypass circuit 230 to hold output data received from read storage array 220.

Figure 3:
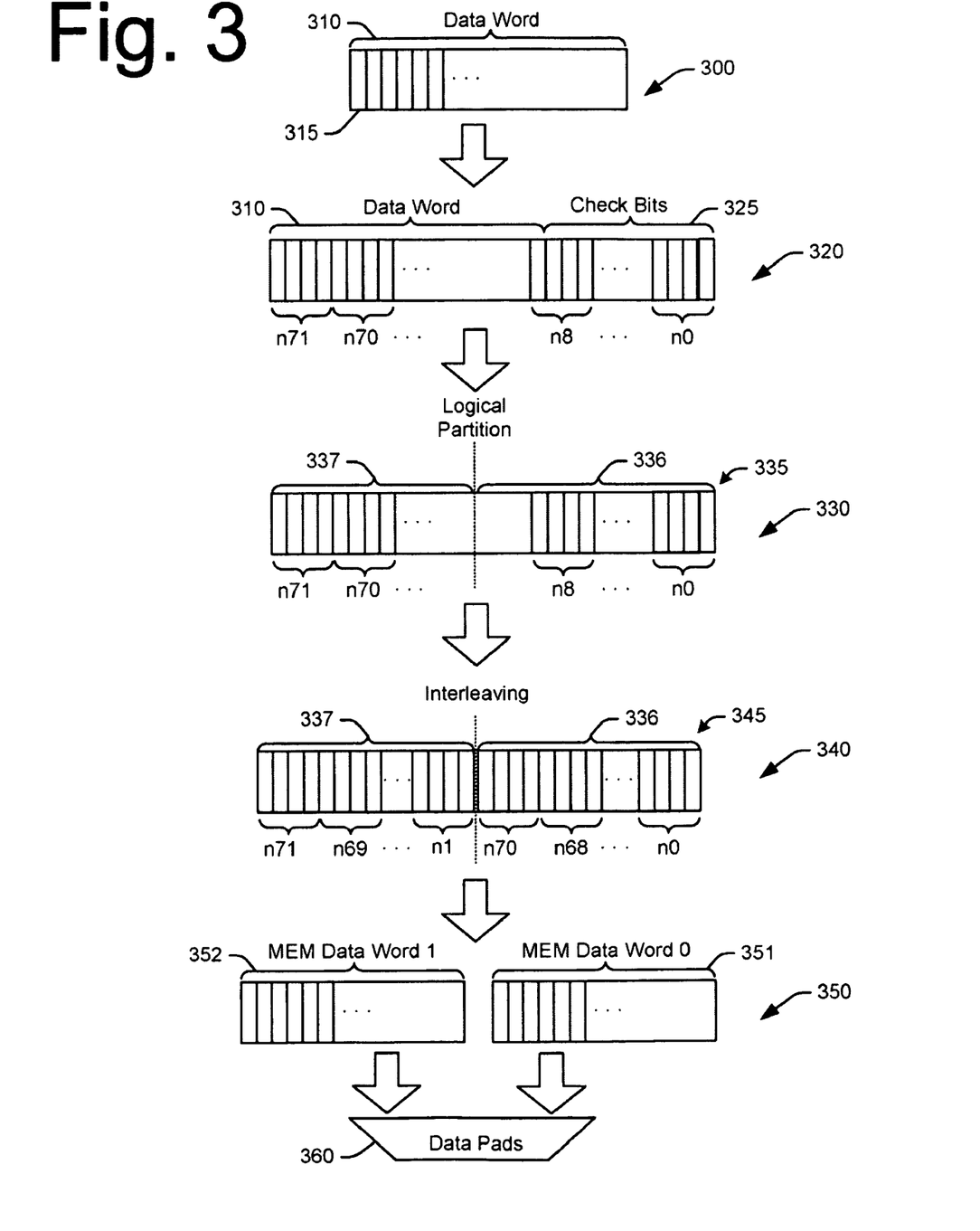
FIG. 3 is an illustration of exemplary data check bit alignment and nibble interleave operations.

FIG. 3 is an illustration of exemplary data check bit alignment and nibble interleave operations. At 300, a quarter cache line may be received at a computer memory system for a write operation. For purposes of illustration, the quarter cache line is illustrated as a data word 310 having a plurality of data bits 315.

At 320, check bits 325 may be generated (e.g., by check bit generator 160 in FIG. 1) for the data word 310. The resulting data word includes 288 bits (256 bits of data and 32 check bits), which can be grouped into "nibbles" (i.e., each nibble containing a half byte or 4 bits). Accordingly, each 288 bit data word has 72 nibbles (designated n0-n71 in FIG. 3).

At 330, the data word and check bits may be logically partitioned. In an exemplary embodiment, a logically partitioned data word 335 includes 144 bits in a first partition 336 (nibbles n0-n35) and 144 bits in a second partition 337 (nibbles n36-n71).

At 340, the data word and check bits may be interleaved. In an exemplary embodiment, the interleaved data word 345 includes "even" nibbles (e.g., n0, n2 . . . n68, n70) in the first partition 336 and "odd" nibbles (e.g., n1, n3 . . . n69, n71) in the second partition 337.

At 350, the interleaved data word 345 is written to the data pads 360 as two memory data words 351, 352 (e.g., "Data Word 0" and "Data Word 1"). The first memory data word 351 includes the interleaved nibbles from the first partition 336 and the second memory data word 351 includes the interleaved nibbles from the second partition 337.

Because the ECC algorithm may operate on the full data word on each clock cycle, it is important to describe how each bit or group of bits within the memory bus data chunk is distributed during write operations. Exemplary bit alignment for the memory data words 351, 352 is discussed below with reference to the illustrations in FIGS. 4-6 for write operations with different memory types. Note, that regardless of the type of memory, data is written to the memory in critical word order zero.

Before continuing, it is noted that the term critical word order as used herein refers to the order bits are written to and read from memory. Critical word order zero refers to a case wherein the lower X number (e.g., 4) of address bits are set to zero causing the data bits to be read from or written to memory in sequential order.

Figure 4:
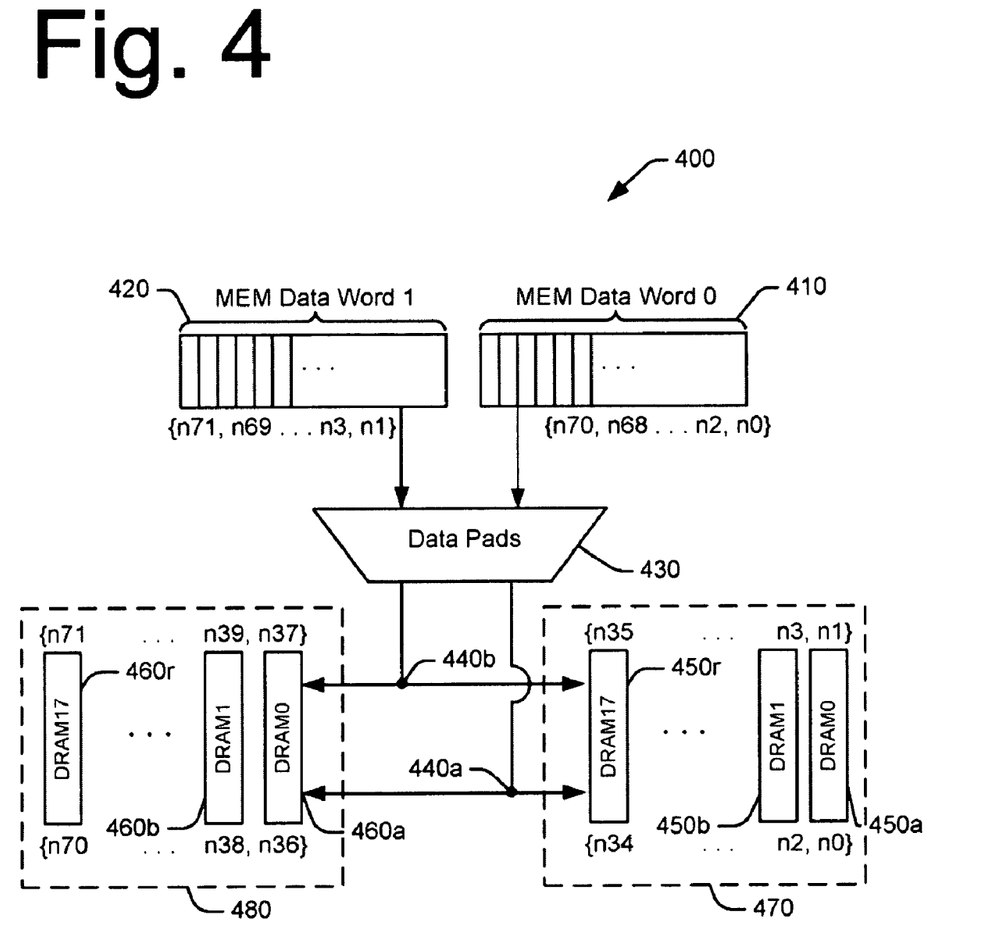
FIG. 4 is an illustration of exemplary write operations for direct attached memory.

FIG. 4 is an illustration of exemplary write operations 400 for a direct attached memory configuration. In particular, FIG. 4 shows the memory data words 410, 420 (e.g., corresponding to memory data words 351, 352, respectively, in FIG. 3) as each is delivered to the data pads 430 and driven out of the data pads 430 onto the memory bus for memory modules 470, 480. Nibble distribution during the write operation is also shown in FIG. 4 in brackets { }.

In a direct attached memory configuration, the first memory data word 410 is distributed to memory modules 470 and 480 (such as a DDR DIMM module) on the rising edge of the write strobe; indicated as write operation 440a. The second data word 420 is distributed to memory modules 470 and 480 on the falling edge of the write strobe; indicated as write operation 440b. Further, the nibbles are aligned such that adjacent nibbles (e.g., n0 and n1; n2 and n3; etc.) are both stored in the same ×4 device (e.g., 450*a-r* or 460*a-r*, such as a ×4 DRAM device). Alternatively, if a ×8 device is implemented in the target memory modules 470 and 480, adjacent bytes (e.g., nibbles 0-3, nibbles 4-7, etc.) are stored at the same ×8 device (e.g., 450*a-h* or 460*a-h*, such as a ×8 DRAM device)

Accordingly, when data is returned during a read operation, a dead ×4 memory device will result in a single aligned byte error in the ECC word (e.g., data word and check bits 320 in FIG. 3) and a dead ×8 memory device will result in two adjacent aligned byte errors in the ECC word, both of which are correctable. Thus, the data alignment method allows correction of one ×8 or two ×4 faulty DRAM memory devices.

Figure 5:
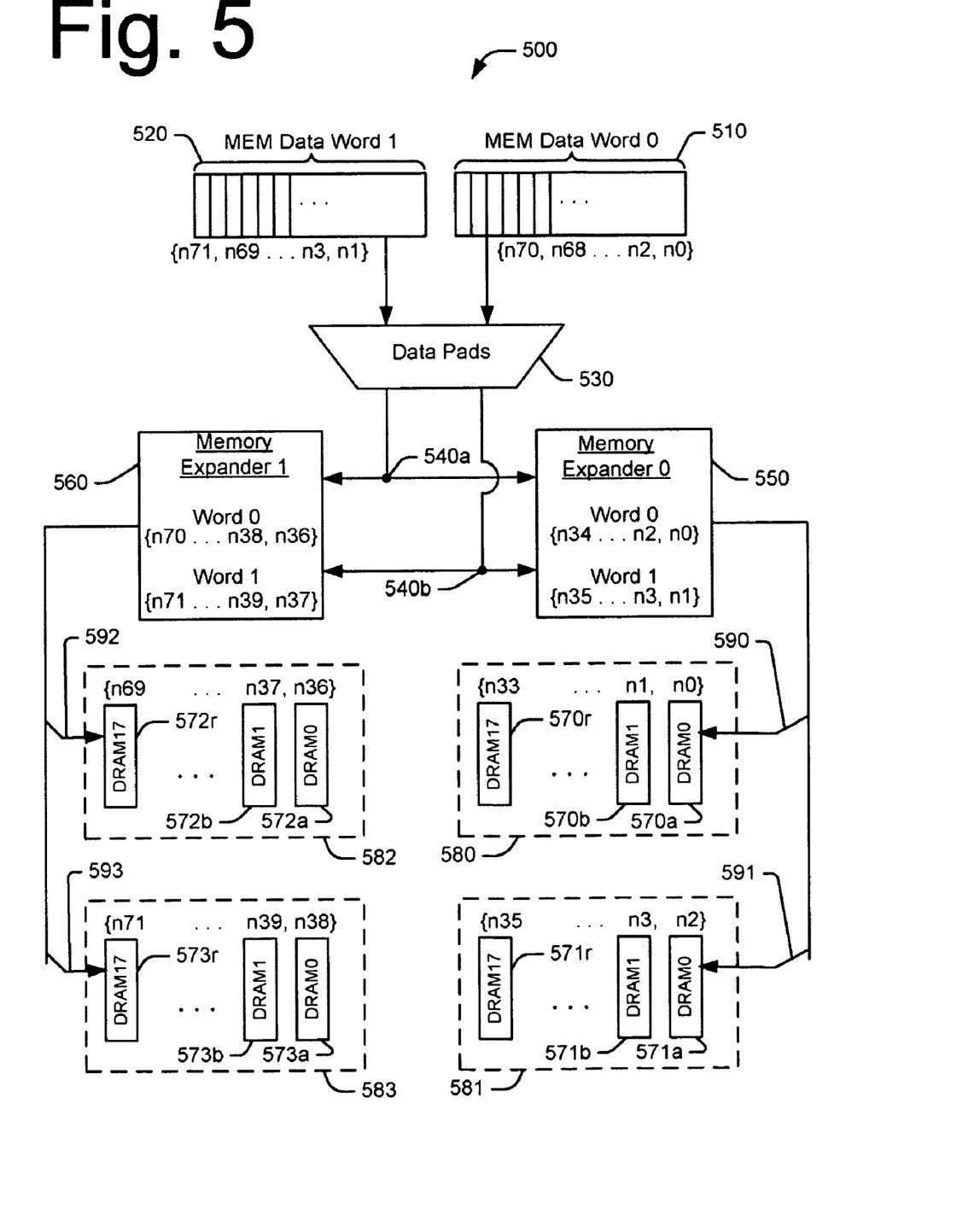
FIG. 5 is an illustration of exemplary write operations for memory subsystems using a memory expander component.

FIG. 5 is an illustration of exemplary write operations 500 for a memory subsystem with a memory expander. The term "memory expander" as used herein refers to multiplexer hardware which connects directly a memory chipset and directs bits from the core memory controller for read and/or write operations to multiple memory devices (e.g., DIMMs). The memory expander thereby enables the use of a greater number of memory devices without having to modify the core memory controller. FIG. 5 shows the memory data words 510, 520 (e.g., corresponding to memory data words 351, 352, respectively, in FIG. 3) as each is delivered to the data pads 530 and driven out of the data pads 530 onto the memory bus for memory expanders 550, 560. Nibble distribution throughout the write operation is also shown in FIG. 5 in brackets { }.

In a memory expander configuration, the first memory data word 510 is distributed to memory expanders 550 and 560 on the rising edge of the write strobe (referred to in FIG. 5 as write operation 540*a*). The second data word 520 is distributed to memory expanders 550, 560 on the falling edge of the write strobe (referred to in FIG. 5 as write operation 540*b*). After internal data buffering and routing at the memory expanders 550 and 560, the combined data words 510 and 520 are distributed to memory modules 580-583 in a single write operation (e.g., on a single edge of a write strobe). Further, in ×4 devices (e.g., ×4 DRAM devices), the nibbles are aligned such that each nibble is stored in a separate ×4 device (e.g., 570*a-r*, 571*a-r*, 572*a-r*, and 573*a-r*). It is noted that if ×8 devices (e.g., ×8 DRAM devices) are implemented in the target memory module 580-583, each aligned byte (e.g., nibbles 0 and 1, nibbles 2 and 3, etc.) is stored in a separate ×8 memory device (e.g., 570*a-h*, 571*a-h*, 572*a-h*, and 573*a-h*).

Accordingly, when data is returned during a read operation read, both a dead ×4 memory device (e.g., 570*a-r*, 571*a-r*, 572*a-r*, and 573*a-r*) and a ×8 dead memory device (e.g., 570*a-h*, 571*a-h*, 572*a-h*, and 573*a-h*) result in a single aligned byte error in the ECC word and two failing memory devices may be corrected.

In order to enable fault isolation, all of the data groupings in the lower 72 bits of the data bus are routed to memory expander 0 and all the data groupings in the upper 72 bits of the data bus are routed to memory expander 1. Further, all of the data groupings in the lower 72 bits of each memory expander are routed to one memory module, and all of the data groupings in the upper 72 bits of each memory expander are routed to one memory module. Accordingly, an ECC failure in any one or more of the bytes in the ECC word indicate failures in the computer memory system as shown in Table 1.

TABLE 1

Fault Isolation in Memory Expander Configuration of FIG. 5

| Failure in ECC word | Location of Faulty DIMM |
|---|---|
| Lower 18 bytes | |
| Even bytes (0, 2, 4, etc.) | Memory Expander 0, Bus 0 (590) |
| Odd Bytes (1, 3, 5, etc.) | Memory Expander 0, Bus 1 (591) |
| Upper 18 bytes | |
| Even bytes (18, 20, 22, etc.) | Memory Expander 1, Bus 0 (592) |
| Odd Bytes (19, 21, 23, etc.) | Memory Expander 1, Bus 1 (593) |

It is noted that other data routings are possible that yield a more complicated fault isolation function. In such embodiments, the data routing throughout the memory system may be designed such that each aligned byte (e.g., nibbles 0 and 1, nibbles 2 and 3, etc.) of the original data word (e.g., 320 in FIG. 3) is routed with all of the bits of the aligned byte going to adjacent ×4 devices. Alternately, in systems using ×8 devices, each aligned byte of the original data word is routed with all of the bits of the aligned byte going to a single ×8 device. It is noted that such an embodiment also enables implementation of either ×4 or ×8 memory devices in the memory subsystem while still preserving chip correct and fault isolation capability.

Figure 6:
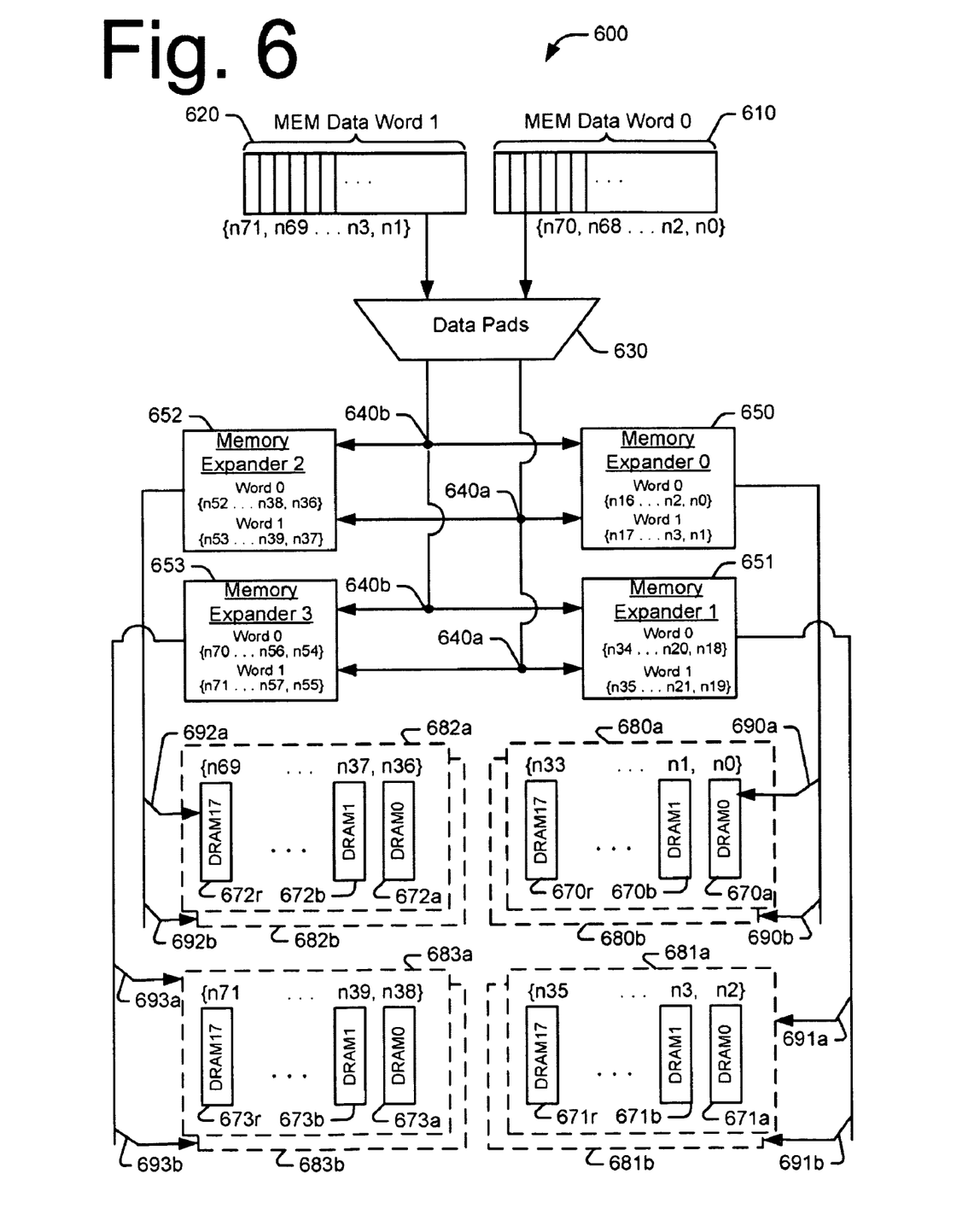
FIG. 6 is an illustration of exemplary write operations for memory subsystems using a larger capacity memory expander component.

FIG. 6 is an illustration of exemplary write operations 600 for an alternative memory expander system. In this embodiment, each memory expander writes to either of the two output memory buses (e.g., 690*a* or 690*b*, 691*a*, 691*b*, etc.) but not to both for each write transaction. It is noted that in this memory expander system, the chip select may be implemented to determine both the memory bus and the memory module on the memory bus accessed for each write operation. In particular, FIG. 6 shows the memory data words 610, 620 (e.g., corresponding to memory data words 351, 352, respectively in FIG. 3) as each is delivered to the data pads 630 and driven out of the data pads 630 onto the memory bus for memory expanders 650-653. Nibble distribution during the write operation is also shown in FIG. 6 in brackets { }.

In the memory expander configuration shown in FIG. 6, the first memory data word 610 is distributed to memory expanders 650-653 on the rising edge of the write strobe (referred to in FIG. 6 as write operation 640*a*). The second memory data word 620 is distributed to memory expanders 650-653 on the falling edge of the write strobe (referred to in FIG. 6 as write operation 640*b*). More particularly, nibbles n0-n17 in memory data words 610 and 620 are distributed to memory expander 0, and nibbles n18-n35 are distributed to memory expander 1. Similarly, nibbles 36-53 in memory data words 610 and 620 are distributed to memory expander 2 and nibbles 54-71 are distributed to memory expander 3. After internal data buffering and routing at the memory expanders 650-653, the combined data words 610 and 620 are distributed to memory modules 680-683 in a single write operation (e.g., during a single edge of a write strobe). Further, in ×4 devices (e.g., ×4 DRAM devices), the nibbles are aligned such that each nibble is stored in a separate ×4 device (e.g., 670*a-r*, 671*a-r*, 672*a-r*, and 673*a-r*). It is noted that if ×8 devices (e.g., ×8 DRAM devices) are implemented in the target memory module 680-683, each aligned byte (e.g., nibbles 0 and 1, nibbles 2 and 3, etc.) is stored in a separate ×8 memory device (e.g., 670*a-h*, 671*a-h*, 672*a-h*, and 673*a-h*).

Accordingly, when data is returned during a read operation, both a dead ×4 memory device (e.g., 670*a-r*, 671*a-r*, 672*a-r*, and 673*a-r*) and a ×8 dead memory device (e.g., 670*a-h*, 671*a-h*, 672*a-h*, and 673*a-h*) result in a single aligned byte error in the ECC word and two failing memory devices may be corrected.

In order to enable fault isolation, all of the data groupings in each successive group of 36 bits of the data bus are routed to the correct memory expander, as shown in FIG. 6. As in the memory expander configuration shown in FIG. 5, all the data groupings in the lower 72 bits of each memory expander are routed to one memory module and all the data groupings in the upper 72 bits of each memory expander are routed to one memory module. Accordingly, an ECC failure in any one or more of the bytes in the ECC word indicate failures in the computer memory system as shown in Table 2.

TABLE 2

Fault Isolation in Memory Expander Configuration of FIG. 6

| Failure in ECC word | Location of Faulty DIMM |
|---|---|
| Bytes 0-8 | Memory Expander 0 |
| Bytes 9-17 | Memory Expander 1 |
| Bytes 18-26 | Memory Expander 2 |
| Bytes 27-35 | Memory Expander 3 |

In the memory expander configuration shown in FIG. 6, the chip select may be examined to determine which memory bus (e.g., 690*a-b*, 691*a-b*, 692*a-b*, and 693*a-b*) and which memory module within that bus resulted in an ECC error.

It is noted that other data routines are possible that yield a more complicated fault isolation function. In such embodiments, the data routing throughout the memory system may be designed such that each aligned byte (e.g., nibbles 0 and 1, nibbles 2 and 3, etc.) of the original data word (e.g., 320 in FIG. 3) is routed with all of the bits of the aligned byte going to adjacent ×4 devices. Alternately, in systems using ×8 devices, each aligned byte of the original data word is routed with all of the bits of the aligned byte going to a single ×8 device. It is noted that such an embodiment also enables implementation of either ×4 or ×8 memory devices in the memory subsystem while still preserving chip correct and fault isolation capability.

Before continuing, it should be understood that the systems and methods described herein are not limited to any particular type or configuration of memory. The memory configurations described with reference to FIGS. 4-6 are shown for purposes of illustration only, and other implementations will also be apparent to those having ordinary skill in the art after having become familiar with the teachings herein.

Having described write operations with reference to FIGS. 3-6, read operations for the computer memory system will now be described. When data is read from memory, the ECC check and correct function of the ECC algorithm is applied before returning the data to the requesting device.

During a read operation, data is read from the memory modules such that each quarter cache line is returned in critical word order 0. However, a requesting device (e.g., processor) may request data from the memory system in a variety of different critical word orders (e.g., any one of eight possible critical word orders). Accordingly, the memory system may be provided with a multiplexer (MUX), e.g., internal to the memory controller. The MUX may be implemented to arrange each quarter cache line into its requested order before storing the quarter cache line in a latch array for later retrieval. The quarter cache line may be arranged such that the ECC check bits reside in the lower 32 bits of the ECC word and only the upper 255 bits of data are re-ordered.

Now, however, the critical word order of the data may not match the critical word order of the data when the check bits were generated. In order to avoid rearranging the data for ECC operations, the H-matrix associated with the particular ECC algorithm chosen for the implementation may be rearranged instead.

Figure 7:
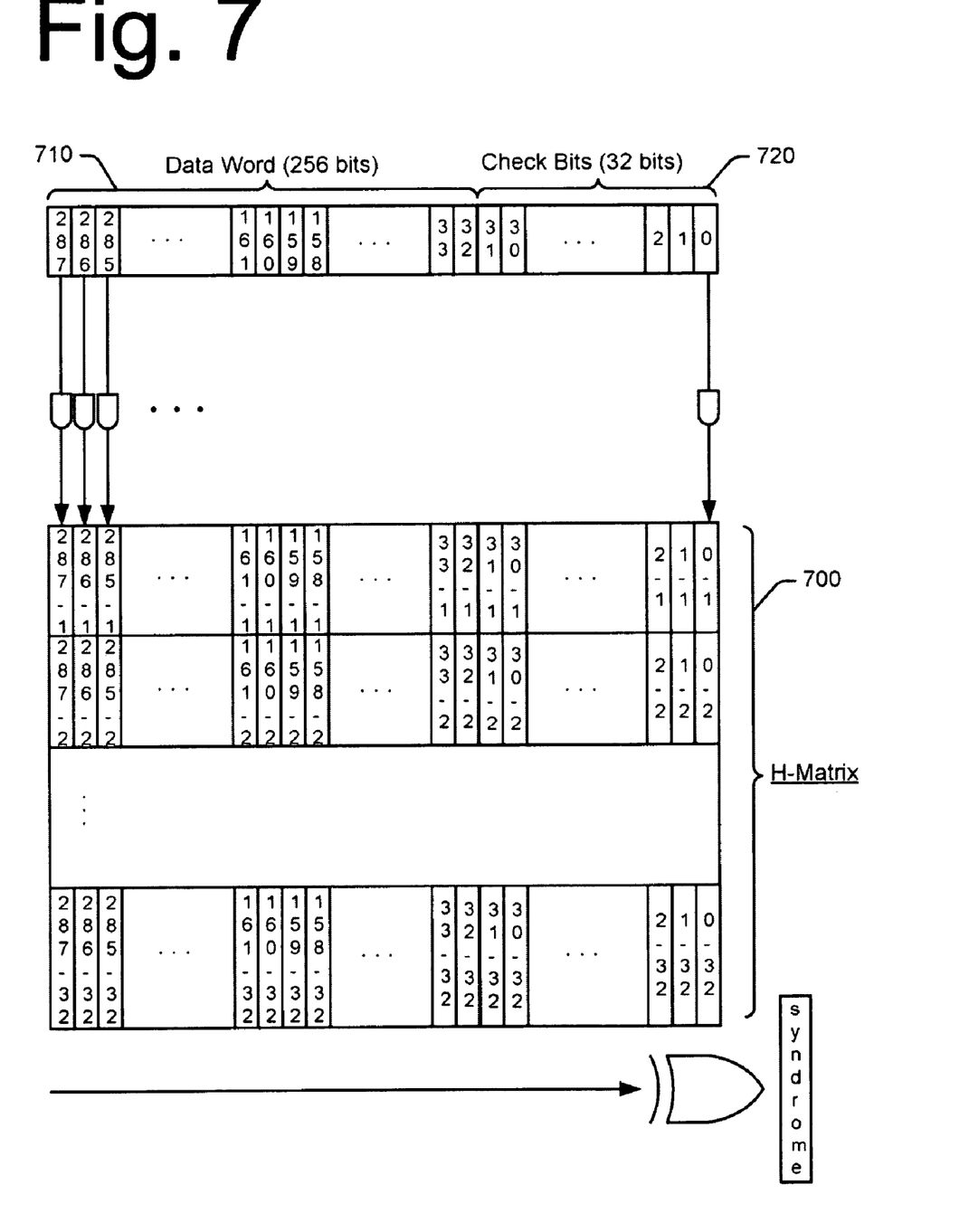
FIG. 7 is an illustration of an exemplary H-matrix alignment for critical word order zero that may be implemented for read operations.
Figure 8:
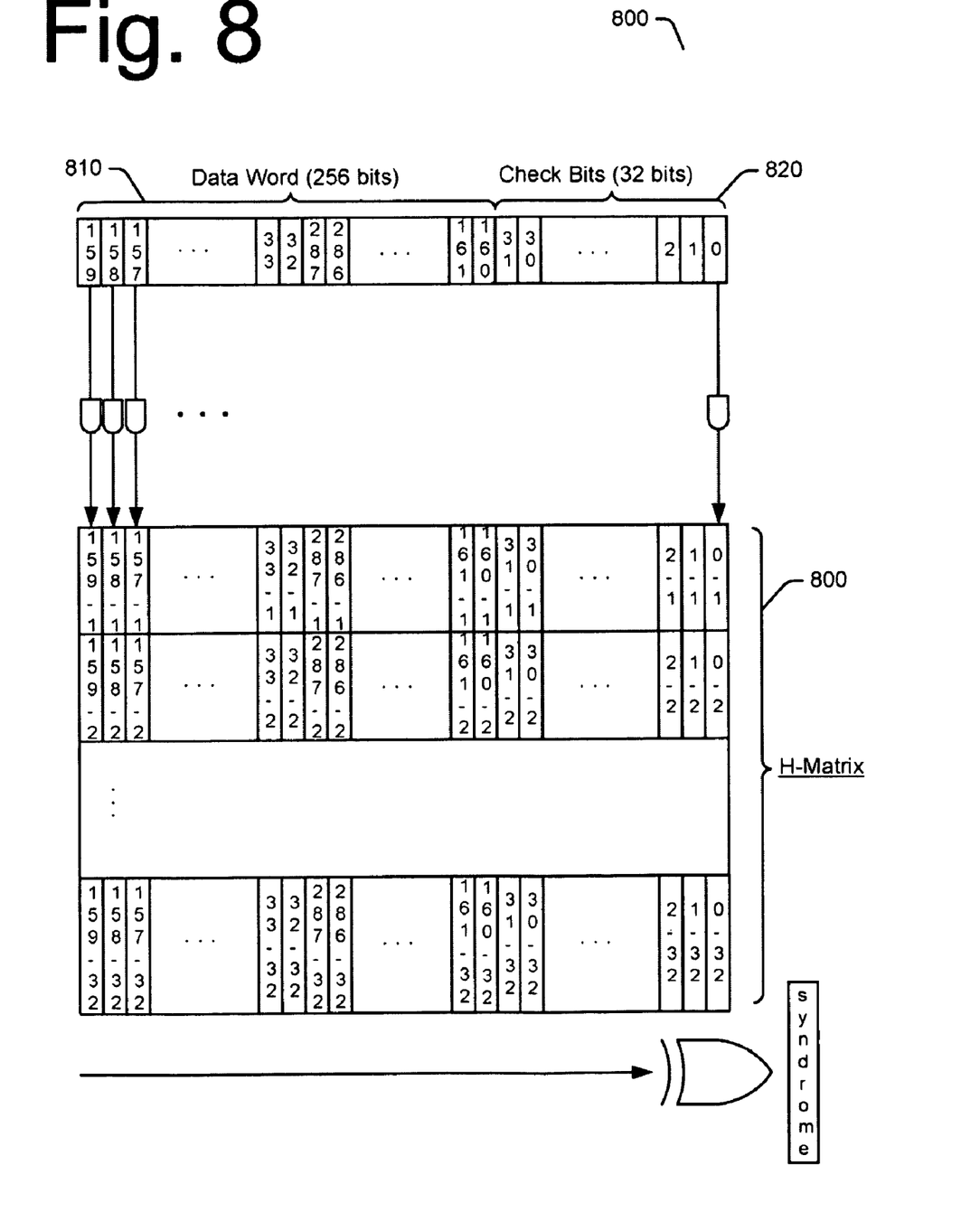
FIG. 8 is an illustration of an exemplary H-matrix alignment for critical word order one that may be implemented for read operations.

FIGS. 7 and 8 are illustrations of exemplary H-matrix alignments in critical word order zero or one. The H-matrix 700 may correspond to the data word 710 and check bits 720, wherein the lower 32 H-matrix entries correspond to the ECC check bits 720, the next 128 H-matrix entries correspond to the first critical word size chunk of data word 720 in the quarter cache line, and the upper 128 H-matrix entries correspond to the second critical word size chunk of data word 720 in the quarter cache line.

During a read operation, each bit of the data word 710 and check bits 720 may be AND'd with all of the bits in the corresponding entry in the H-matrix. The results are then XOR'd to generate a syndrome of width equal to the width of one H-matrix entry. The syndrome may be used by the ECC algorithm for check and correct operations.

The H-matrix input to the ECC algorithm may be rearranged, e.g., as shown for critical word order one in FIG. 8, although H-matrices may be aligned for any critical word order requested by the requesting device. Accordingly, H-matrix 800 entries are realigned to maintain correspondence between each bit of the quarter cache and its associated H-matrix entry, which correspondence was established when the check bits were generated. Thus, for any quarter cache line, the check and correct operation may be carried out with the data and check bits aligned in any order as requested by the processor as long as the ordering of the H-matrix entries is equivalently aligned prior to the check and correct operation.

It is noted that H-matrix realignment may be done on the clock preceding the data read-out from the storage array, thus hiding the latency inherent in rearranging data and allowing the data to flow to the requesting device with minimal latency. It is also noted that the exemplary implementations discussed above are provided for purposes of illustration. Still other implementations are also contemplated.

Exemplary Operations

FIGS. 9-12 are flowcharts illustrating exemplary operations to implement chip correct and fault isolation in computer memory systems. The operations may be embodied as logic in a computer memory system. In an exemplary embodiment, the components and connections depicted in the figures may be used to implement the chip correct and fault isolation operations in computer memory systems.

Figure 9:
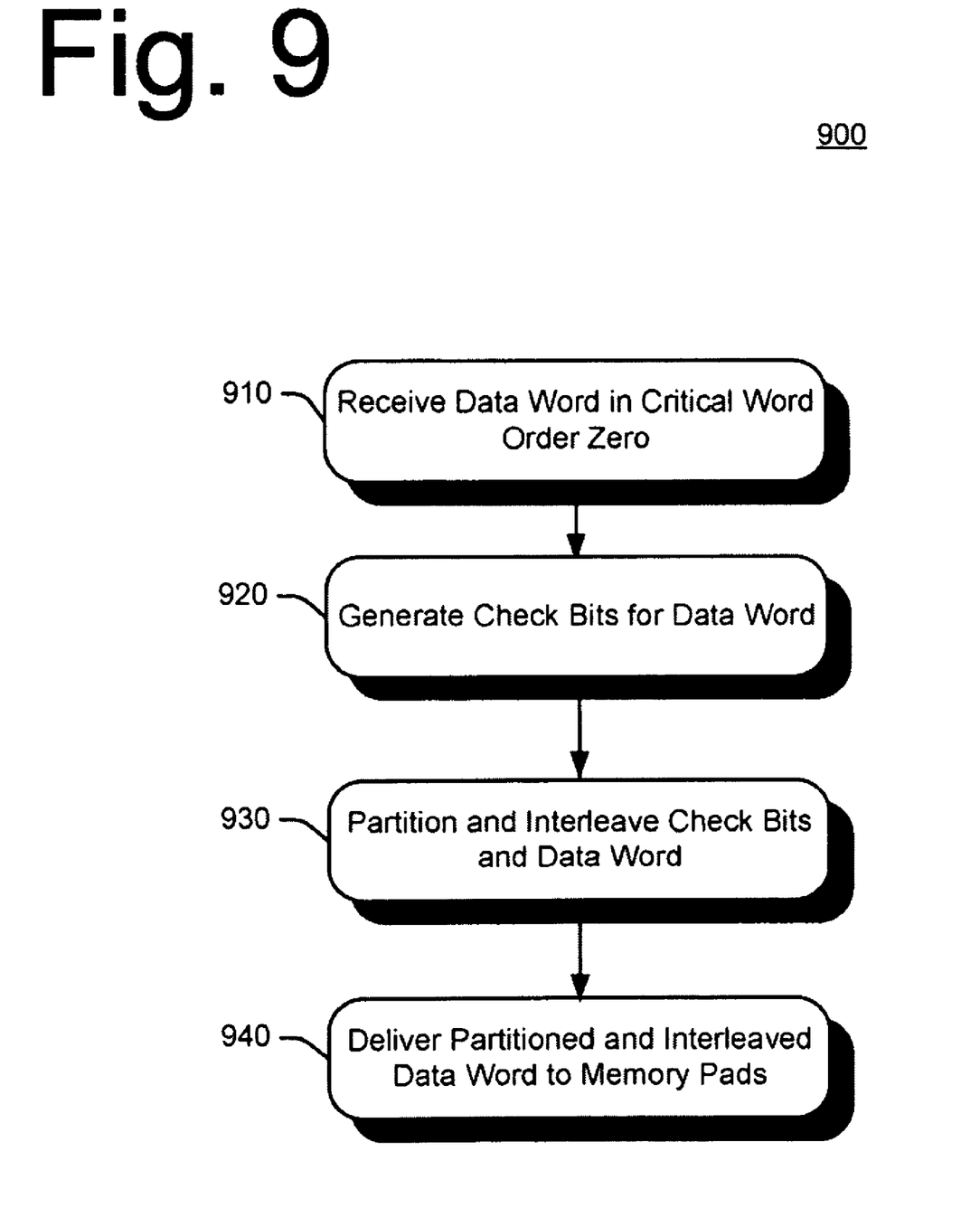
FIG. 9 is a flowchart illustrating exemplary write operations to implement chip correct and fault isolation in computer memory systems.

FIG. 9 is a flowchart illustrating exemplary write operations 900 to implement chip correct and fault isolation in computer memory systems. In operation 910 a data word is received by a computer memory system in critical word order zero. In operation 920, check bits are generated for the data word. In operation 930, the data word and check bits are partitioned and interleaved. In operation 940, the partitioned and interleaved data are delivered to one or more memory pads in the computer memory system.

Figure 10:
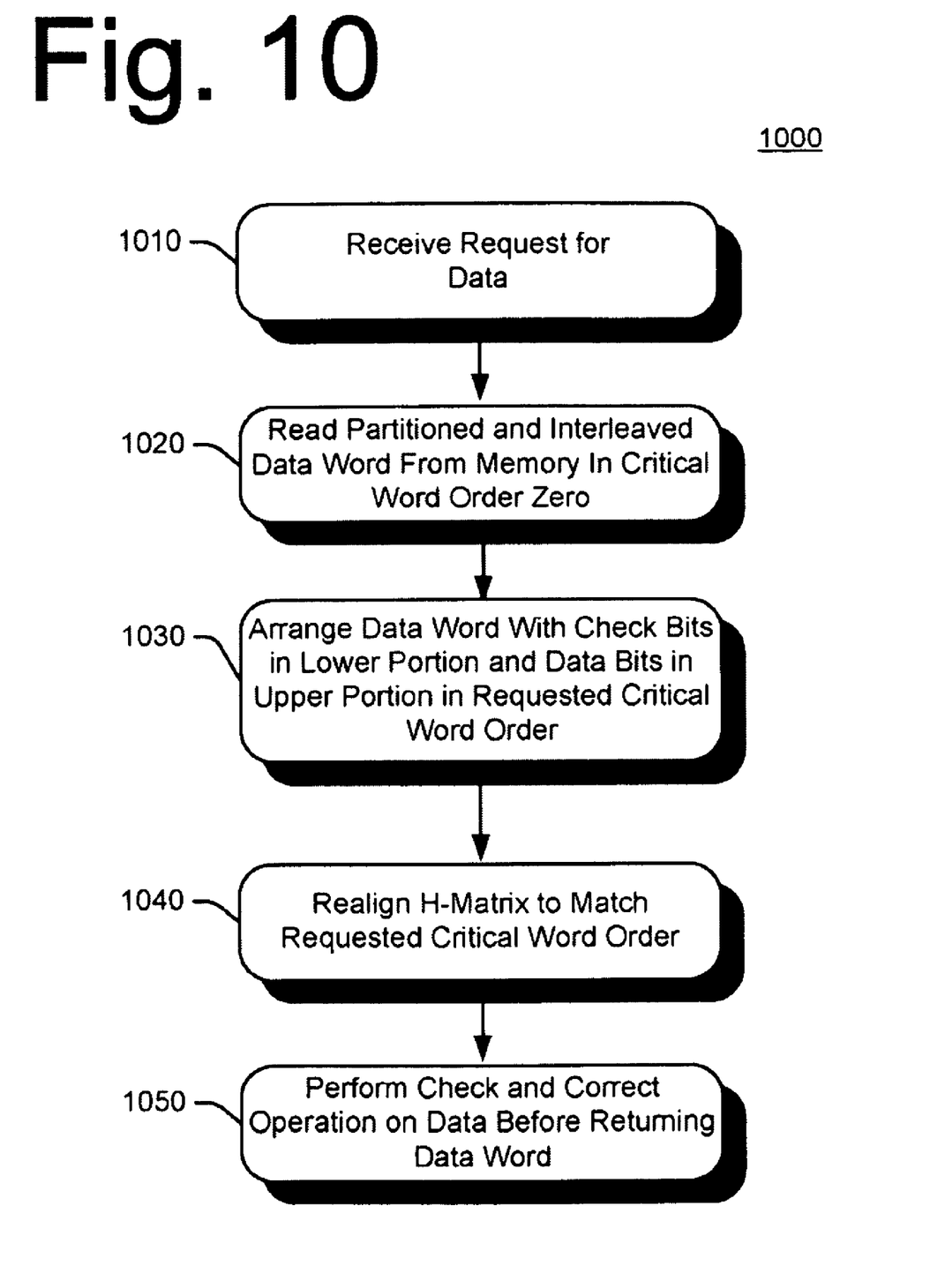
FIG. 10 is a flowchart illustrating exemplary read operations to implement chip correct and fault isolation in computer memory systems.

FIG. 10 is a flowchart illustrating exemplary read operations 1000 to implement chip correct and fault isolation in computer memory systems. In operation 1010 a request for a data word is received by a computer memory system. In operation 1020, the partitioned and interleaved data is read from one or more memory modules in critical word order zero (i.e., the same order it was written). In operation 1030, the data word is arranged with check bits in a lower portion and data bits in an upper portion in the critical word order requested (e.g., by a requestor interface). In operation 1040, an H-matrix associated with the selected ECC algorithm is realigned to match the requested critical word order of the cache line. In operation 1050, check and correct operations are performed on the data word before returning the data word (e.g., to the requestor interface).

Figure 11:
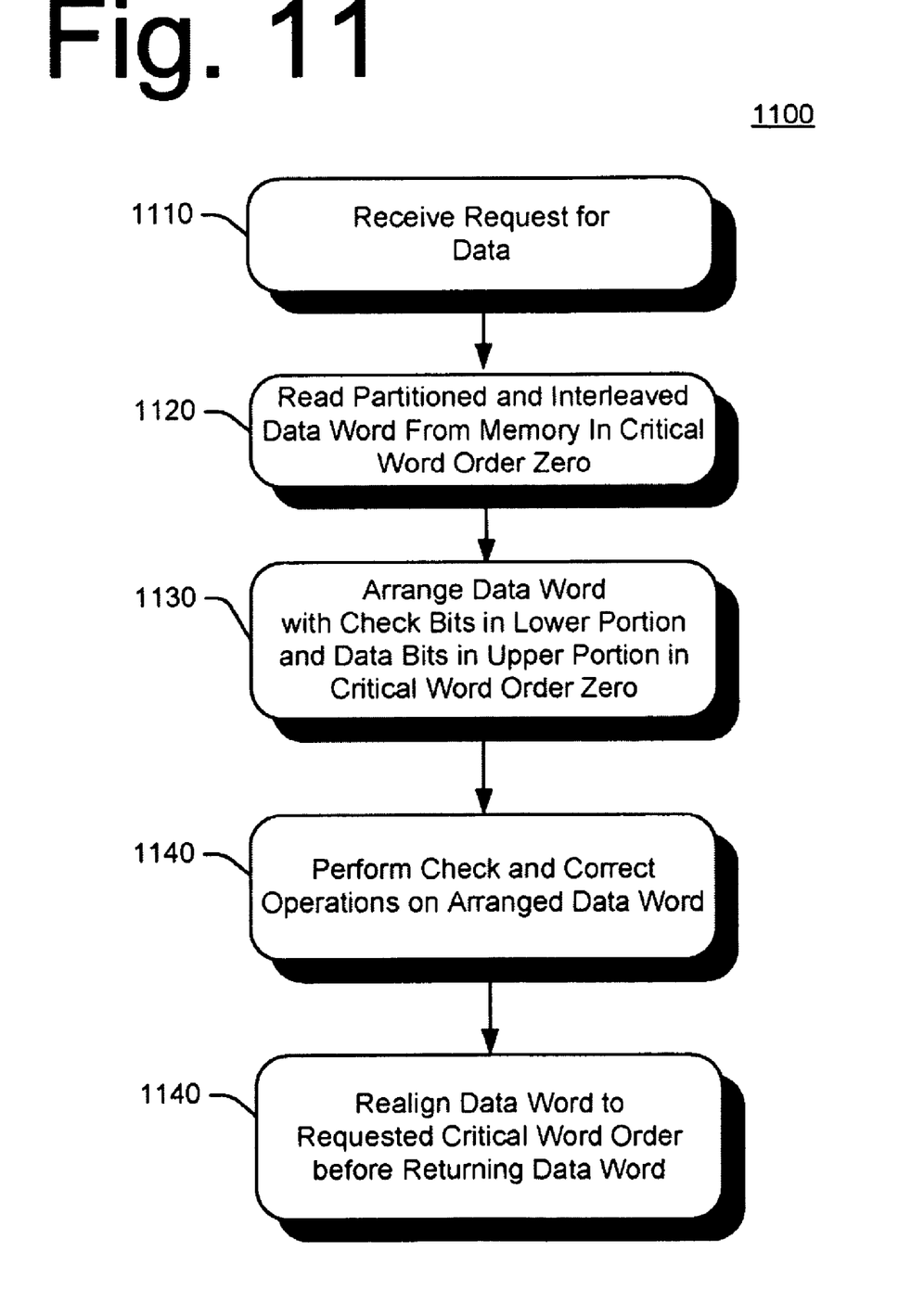
FIG. 11 is a flowchart illustrating alternative read operations to implement chip correct and fault isolation in computer memory systems.

FIG. 11 is a flowchart illustrating alternative read operations 1100 to implement chip correct and fault isolation in computer memory systems. In operation 1110 a request for a data word is received by a computer memory system. In operation 1120, the partitioned and interleaved data is read from one or more memory modules in critical word order zero (i.e., the same order it was written). In operation 1130, the data word is arranged with check bits in a lower portion and data bits in an upper portion in critical word order zero. In operation 1140, check and correct operations are performed on the data word. In operation 1150, the data word is realigned to the requested critical word order before returning the data word (e.g., to the requestor interface).

Figure 12:
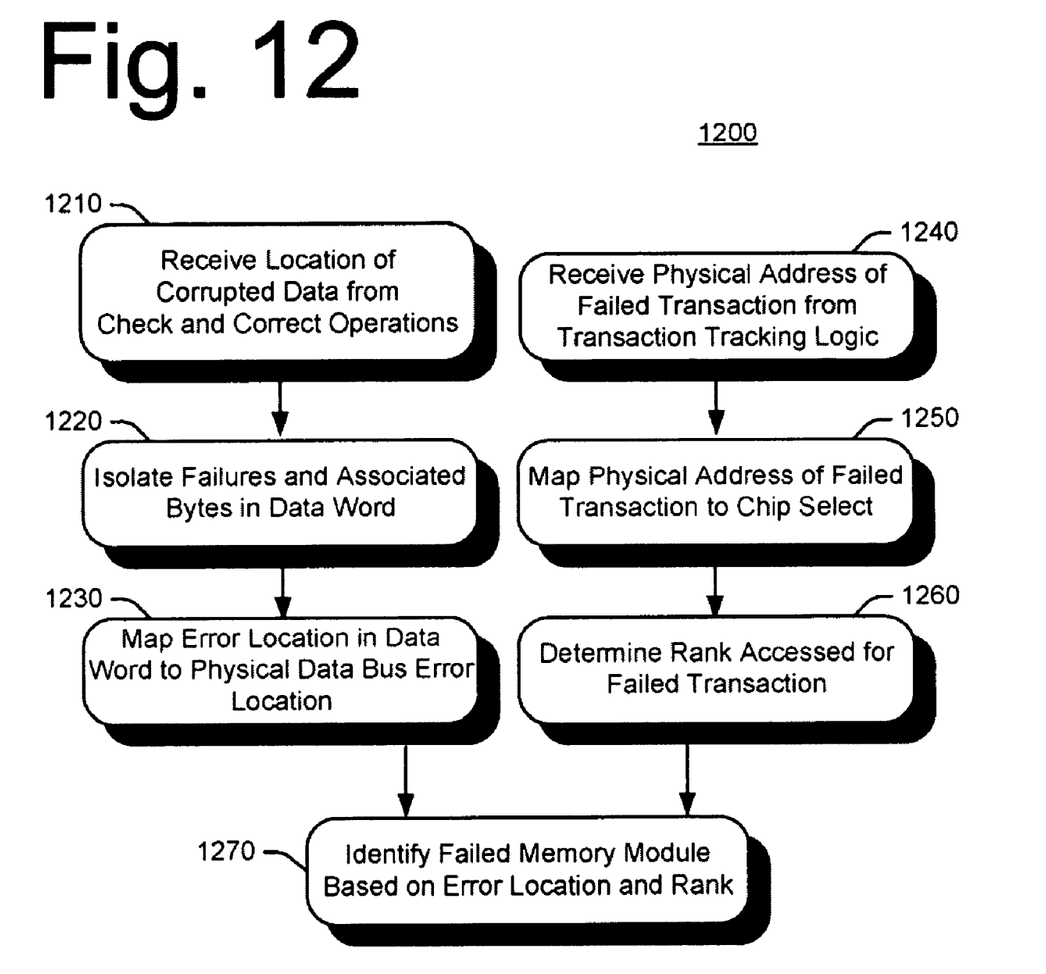
FIG. 12 is a flowchart illustrating exemplary fault isolation operations.

FIG. 12 is a flowchart illustrating exemplary fault isolation operations 1200. It is noted that operations 1210-1230 and operations 1240-1260 are generally executed in parallel (i.e., at approximately the same time) and the results are combined for operation 1270, as illustrated in FIG. 12. However, the operations are not limited to any particular timing. For example, operations 1210-1230 may occur before operations 1240-1260 (or vice versa). The operations may also be offset. By way of illustration, operation 1210 may be executed in parallel with operations 1240-1250, operation 1220 may be executed in parallel with operation 1260, and operation 1230 may be executed after operations 1240-1260 have executed.

In operation 1210, a location of corrupted data is received from check and correct operations. In operation 1220, failures and associated data bytes are isolated in the data word. In operation 1230, error location(s) in the data word are mapped to a physical data bus error location.

In operation 1240, a physical address for a failed transaction is received, e.g., from transaction tracking logic. In operation 1250, the physical address may be mapped to a chip select. In operation 1260, the chip select accessed for the failed transaction may be used to determine the rank of memory modules containing the failure.

In operation 1270, fault isolation information from operations 1210-1230 and operations 1240-1260 may be used to identify a failed memory module and memory device, e.g., based on the error location determined in operations 1210-1230 and the rank determined in operations 1240-1260.

The operations shown and described herein are provided to illustrate exemplary embodiments of chip correct and fault isolation in computer memory systems. It is noted that the operations are not limited to the ordering shown. In other embodiments, still other operations may be implemented to enable chip correct and fault isolation in computer memory systems.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A memory subsystem with fault isolation, comprising:
a first data bus routing data groupings in a lower 72 bits to a first memory expander;
a second data bus routing data groupings in an upper 72 bits to a second memory expander;
a first memory module receiving all of the data groupings in the lower 72 bits of each memory expander;
a second memory module receiving all of the data groupings in the upper 72 bits of each memory expander; and
wherein a failure in any one or more bytes in an Error Correction Code (ECC) word indicate failures in the computer memory system.

2. The memory subsystem of claim 1, wherein a failure in even bytes in a lower 18 bytes of the ECC word indicate a failure in the first memory expander and the first data bus.

3. The memory subsystem of claim 1, wherein a failure in odd bytes in a lower 18 bytes of the ECC word indicate a failure in the first memory expander and the second data bus.

4. The memory subsystem of claim 1, wherein a failure in even bytes in an upper 18 bytes of the ECC word indicate a failure in the second memory expander and the first data bus.

5. The memory subsystem of claim 1, wherein a failure in odd bytes in an upper 18 bytes of the ECC word indicate a failure in the second memory expander and the second data bus.

6. The memory subsystem of claim 1, wherein the memory expander includes multiplexer hardware connecting directly a memory chipset.

7. The memory subsystem of claim 6, wherein the memory expander directs bits from the core memory controller for read and/or write operations to multiple memory devices.

8. The memory subsystem of claim 1, wherein the memory expander enables use of memory devices without modifying core memory controller.

9. The memory subsystem of claim 1, wherein a first memory data word is distributed to the memory expander on a rising edge of a write strobe, a second data word is distributed to the memory expander on a falling edge of the write strobe, and combined data words are distributed to memory modules in a single write operation on a single edge of a write strobe.

10. The memory subsystem of claim 1, wherein nibbles are aligned with each nibble stored in a separate memory device so that when data is returned during a read operation a dead memory device results in a single aligned byte error and two failing memory devices may be corrected.

11. The memory subsystem of claim 1, wherein data routing is designed with each aligned byte of an original data word being routed with all bits of the aligned byte going to adjacent memory devices.

12. The memory subsystem of claim 1, wherein data routing is designed with each aligned byte of an original data word being routed with all bits of the aligned byte going to a single memory device.

13. A memory subsystem with fault isolation, comprising:
a plurality of memory expanders, each memory expander writing to either but not both of two output memory buses for each write transaction;
a plurality of data pads and a memory bus for the plurality of memory expanders; and
wherein memory data words are delivered to the data pads and driven out of the data pads onto a memory bus for the plurality of memory expanders, a first memory data word distributed to the plurality of memory expanders on a rising edge of a write strobe, a second memory data word distributed to the plurality of memory expanders on a falling edge of the write strobe so that combined data words are distributed to memory modules in a single write operation during a single edge of the write strobe and when data is returned during a read operation, a dead memory device results in a single aligned byte error in an Error Correction Code (ECC) word and up to two failing memory devices are corrected.

14. The memory subsystem of claim 13, wherein all data groupings in a lower 72 bits of each memory expander are routed to one memory module and all data groupings in an upper 72 bits of each memory expander are routed to a different memory module so that an ECC failure in any one or more bytes in the ECC word indicate failures.

15. The memory subsystem of claim 13, wherein a failure in bytes 0-8 in the ECC word indicate a failure in Memory Expander 0.

16. The memory subsystem of claim 13, wherein a failure in bytes 9-17 in the ECC word indicate a failure in Memory Expander 1.

17. The memory subsystem of claim 13, wherein a failure in bytes 18-26 in the ECC word indicate a failure in Memory Expander 2.

18. The memory subsystem of claim 13, wherein a failure in bytes 27-35 in the ECC word indicate a failure in Memory Expander 3.

19. The memory subsystem of claim 13, wherein chip select is examined to determine which memory bus and which memory module within the memory bus resulted in an ECC error.

20. The memory subsystem of claim 13, wherein data routing is designed with either:

each aligned byte of an original data word routed with all bits of the aligned byte going to adjacent memory devices; or each aligned byte of the original data word routed with all bits of the aligned byte going to a single memory device.

* * * * *